US010235531B2

(12) United States Patent
Block et al.

(10) Patent No.: US 10,235,531 B2
(45) Date of Patent: Mar. 19, 2019

(54) COLUMN PROTECTION

(71) Applicant: SAP SE, Walldorf (DE)

(72) Inventors: Meinolf Block, Heidelberg (DE); Christoph Hohner, Walldorf (DE); Martin Schindewolf, Walldorf (DE); Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 15/202,498

(22) Filed: Jul. 5, 2016

(65) Prior Publication Data
US 2018/0012031 A1    Jan. 11, 2018

(51) Int. Cl.
*G06F 17/30* (2006.01)
*G06F 7/00* (2006.01)
*G06F 21/60* (2013.01)
*G06F 21/62* (2013.01)
*G06F 21/00* (2013.01)

(52) U.S. Cl.
CPC .... *G06F 21/6218* (2013.01); *G06F 17/30315* (2013.01); *G06F 17/30339* (2013.01)

(58) Field of Classification Search
None
See application file for complete search history.

(56) References Cited

U.S. PATENT DOCUMENTS

2008/0313134 A1* 12/2008 Lei .................... G06F 17/30442
2016/0292185 A1* 10/2016 Cosic ................. G06F 17/3056

* cited by examiner

*Primary Examiner* — Alexander Lagor
(74) *Attorney, Agent, or Firm* — Mintz Levin Cohn Ferris Glovsky and Popeo, P.C.

(57) ABSTRACT

Methods, systems, and apparatus, including computer program products, are provided for configuring access controls to a database. In one aspect there is provided a method. The method may include receiving, from a first user, a table declaration for creating a database table in a database; generating, based on the table declaration, the database table; receiving, from the first user, a specification of one or more access mechanisms that have a privilege to access the database table; receiving a designation of at least one column in the database table as a protected column and one or more users who have a privilege to access the content of the protected column; and providing control over access to the content of the protected column based at least in part on the specification of the one or more access mechanisms and the designation of the at least one column and the second user.

10 Claims, 5 Drawing Sheets

COLUMN PROTECTION

TECHNICAL FIELD

The subject matter described herein generally relates to database processing and, more specifically, to providing access protection on a column level.

BACKGROUND

Data in a database (e.g., relational database) may be organized and stored in database tables. Existing mechanisms for controlling access to a database do not provide a sufficiently broad range of protection for data in database tables. For example, Structured Query Language (SQL) object privileges regulate access based on the type of SQL operation (e.g., select, insert, update, delete, execute) attempted by a user. But SQL operation privileges tend to be overly broad as a user can gain access to all of the data in a database table by invoking one or more permitted SQL operations. By contrast, analytic privileges impose read access limitations on specific subsets of data retrieved by invoking one or more SQL operations permitted under a user's SQL object privileges. Thus, analytic privileges may be unduly restrictive for certain users and/or applications.

SUMMARY

Methods, systems, and articles of manufacture, including computer program products, are provided for column protection. In some implementations of the current subject matter, there is provided a method for column protection. The method can include: receiving, from a first user, a table declaration for creating a database table in a database; generating, based on the table declaration, the database table; receiving, from the first user, a specification of one or more access mechanisms that have a privilege to access the database table; receiving a designation of at least one column in the database table as a protected column and one or more users who have a privilege to access the content of the protected column; and providing control over access to the content of the protected column based at least in part on the specification of the one or more access mechanisms and the designation of the at least one column and the second user.

In some variations one or more of the following features can optionally be included in any feasible combination. The method can further include: receiving, from the first user, a designation of one or more column protection owners, wherein the designation of the protected column and the one or more users with the privilege to access the content of the protected column are valid only when received from the one or more designated column protection owners. The database table can be generated to include columns that are not protected by default, and wherein the one or more protection configurations can change an original configuration of the database table such that the at least one column in the database table is protected. The one or more access mechanisms can be critical access mechanisms that access data associated with a plurality of users.

In some implementations of the current subject matter, there is provided a method for column protection. The method can include: receiving, from a user, a request to use an access mechanism to access a content of a column from a database table; determining that the column is designated as a protected column; in response to determining that the column is designated as a protected column: determining that the access mechanism has a privilege to access the content of the protected column; and in response to determining that the access mechanism has the privilege to access the content of the privilege column, apply the access mechanism to the content of the protected column.

In some variations one or more of the following features can optionally be included in any feasible combination. The method can further include: determining that the access mechanism does not have the privilege to access the content of the protected column; in response to determining that the access mechanism does not have the privilege to access the content of the protected column, determining whether the user has the privilege to access the content of the protected column; and in response to determining that the user has the privilege to access the content of the protected column: extending the privilege to access the content of the protected column to at least one lower level access mechanism; and applying the access mechanism to the content of the protected column. The access mechanism and the at least one lower level access mechanism can comprise a hierarchical view stack. The method can further include: determining that the user does not have the privilege to access the content of the protected column; in response to determining that the user does not have the privilege to access the content of the protected column: determining that no higher level access mechanism have the privilege to access the content of the protected column; and in response to determining that no higher level access mechanism have the privilege to access the content of the protected column, rejecting the request to use the access mechanism to access the content of the protected column. The access mechanism can comprise a view or a procedure on the content of the column from the database table.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an in-memory database management system, it should be readily understood that such features are not intended to be limiting.

The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter includes a number of aspects that can be applied individually or in combinations of one or more such aspects to control access to data occupying specific columns in a database table. Implementations of the current subject matter provide dual control over access to data occupying specific columns in a database table. That is, access to data in a particular column can be restricted to one or more users. In addition, access to the data in the column can be restricted based on the access mechanism (e.g., view, procedure) used to access the data.

Figure 1:
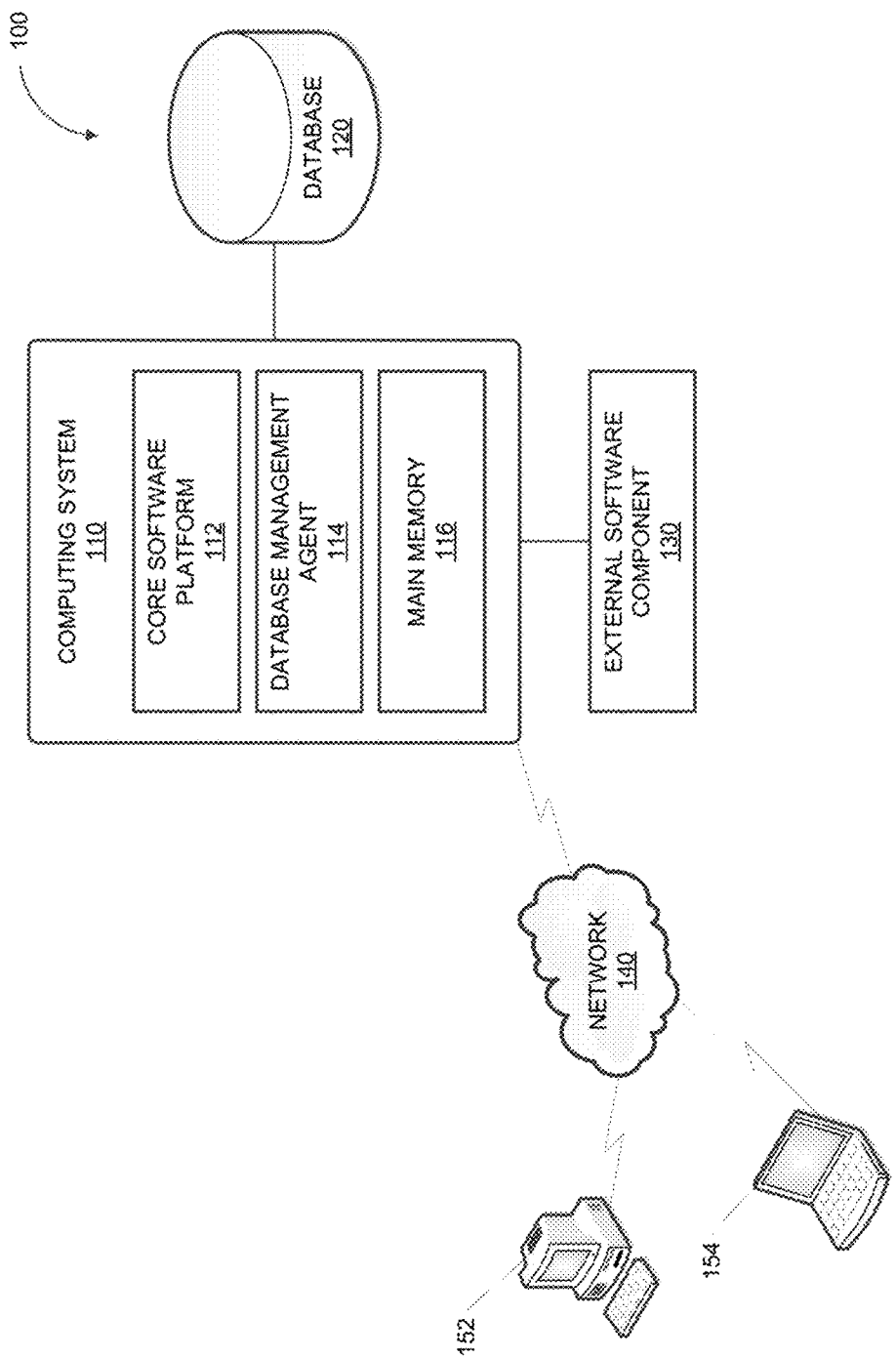
FIG. 1 depicts a block diagram illustrating a network environment consistent with implementations of the current subject matter.

FIG. 1 depicts a block diagram illustrating a network environment 100 consistent with implementations of the current subject matter. Referring to FIG. 1, a computing system 110 can include a core software platform 112, a database management agent 114, and a main memory 116. A plurality of users including, for example, a first user 152 and a second user 154, can access the computing system 112 via a wired and/or wireless network 140 (e.g. a local area network, a wide area network, a wireless network, and/or the Internet). The computing system 110 can be configured to implement one or more features of the current subject matter including, for example, providing access control to the data stored in a database 120.

In some implementations of the current subject matter, the core software platform 112 can include plurality of operations that, when executed by one or more programmable processors, provide functionalities of a software application that implement and/or applies database management features. Alternately or additionally, the computing system 112 can aggregate or otherwise provide a gateway via which the first user 152 and/or the second user 154 can access functionalities provided by an external software component 130.

In some implementations of the current subject matter, the database management agent 114 can be configured to access the database 120 (e.g., based at least in part on column-level access controls). The database 120 can provide one or more forms of persistent storage (e.g. hard disks, solid state drives, optical storage, or the like) capable of maintaining data across different scenarios including, for example, system restarts and power loss. The database 120 can be further adapted to store any kind of data including, for example, database tables, dictionaries, data objects (e.g. business objects), and metadata.

Meanwhile, the main memory 116 can be volatile memory (e.g., dynamic random access memory (DRAM)) optimized for rapid data access. In some implementations of the current subject matter, the database management agent 114 can be configured to load at least a portion of the data from the database 120 and cache that data in the main memory 116. Caching data from the database 120 in the main memory 116 can accelerate access to the data stored in the database 120.

Figure 2:
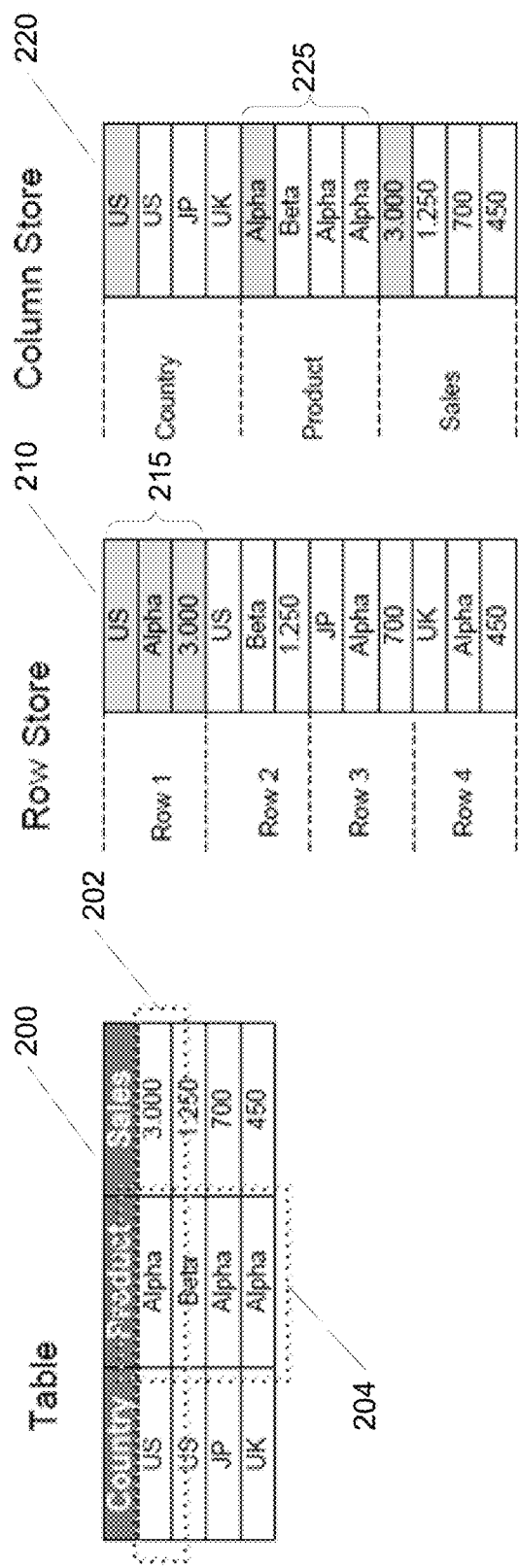
FIG. 2 illustrates a row store and a column store consistent with implementations of the current subject matter.

FIG. 2 illustrates a row store 210 and a column store 220 consistent with implementations of the current subject matter. Referring to FIGS. 1-2, data stored in a database (e.g., the main memory 116, the database 120) can be organized in a table format. For example, data in a database can correspond to a table 200, which includes a plurality of rows (e.g., a row 202) and columns (e.g., a column 204).

The memory for storing data (e.g., the memory resources in the main memory 116 and/or database 120) can be organized in a linear sequence. Thus, if a database is implemented as the row store 210, data from a same row of the table 200 (e.g., the row 202) can be stored in contiguous memory locations in the database (e.g., a first memory block 215). Meanwhile, if a database is implemented as the column store 220, data from a same column of the table 200 (e.g., the column 204) can be stored in contiguous memory locations in the database (e.g., a second memory block 225).

In some implementations of the current subject matter, access to data in a database may be controlled on a column level. As such, access to the column 204 can be controlled based on the user attempting to access the data occupying the column 204. In addition, access to the column 204 can be controlled based on an access mechanism (e.g., view, procedure) used to access the data occupying the column 204.

Figure 3:
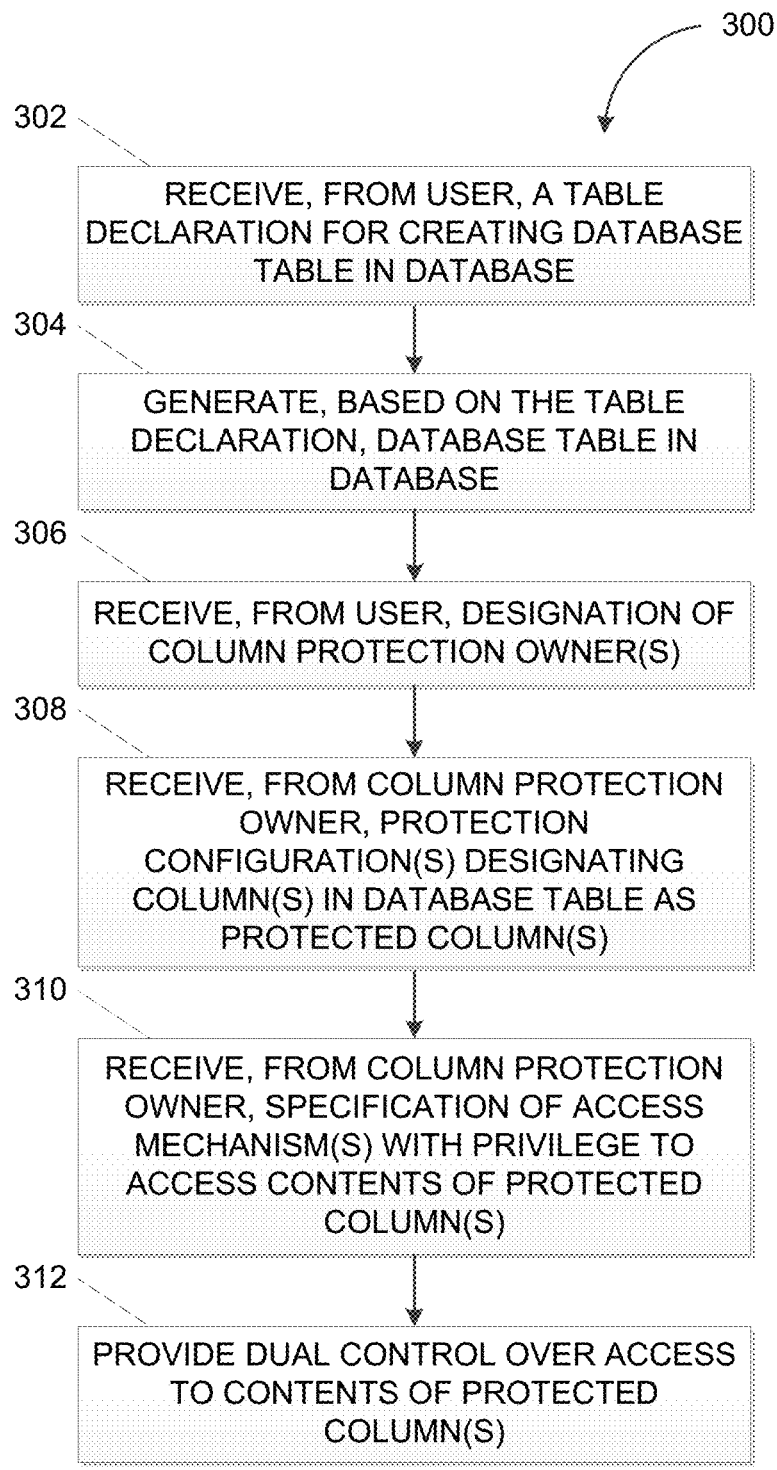
FIG. 3 depicts a flowchart illustrating a process for configuring access controls to a database consistent with implementations of the current subject matter.

FIG. 3 depicts a flowchart illustrating a process 300 for configuring access controls to a database consistent with implementations of the current subject matter. Referring to FIGS. 1-3, the process 300 can be performed by the computing system 110 to control access to the contents of one or more columns (e.g., the column 204) in a database table (e.g., the table 200) stored at the database 120.

The computing system 110 receives, from a user, a table declaration for creating a database table in the database 120 (302). For example, the computing system 110 may receive, from the first user 152 (or another user), a table declaration for creating the table 200 in the database 120. An example of a table declaration that is consistent with some implementations of the current subject matter is shown below.

```
CREATE [...] TABLE <table_name> <table_contents_source> [...]
   <table_contents_source> ::= (<table_element>, . . .) | ...
   <table_element> ::= <column_definition> [...] | <...>
   <column_definition> ::= <column_name>
                        {<data_type> | <lob_data_type>}
                        [...]
                        [<column_protection>]
<column_protection> ::= PROTECTION-CONFIGURATION
<prot_conf_name>
            DEFAULT [NOT] ENCRYPTED AND
            [NOT] PROTECTED
```

In some implementations of the current subject matter, the contents of a column in a database table (e.g., the column 204 in the table 200) can be encrypted and/or protected. That is, the contents of a column may be encrypted in addition to or instead of being subject to user and/or access mechanism based access controls. Protecting the contents of a column can provide protection against internal attacks (e.g., by users who are authorized to access only some but not all of the data in the database 120). Meanwhile, encrypting the contents of a column can provide protection against external attacks (e.g., by malicious actors who are not authorized to access the database 120). In some implementations of the current subject matter, for additional security, the contents of a column can be encrypted along with one or more cryptographic salt (e.g., random values).

In some implementations of the current subject matter, a table declaration can contain a default clause to indicate whether the columns in a database table are to be protected and/or encrypted by default. In the sample table declaration above, the default clause indicates that the columns in a corresponding table are neither protected nor encrypted by default. However, a default clause in a different table declaration may indicate that the columns in a corresponding table are protected and/or encrypted by default.

The computing system 110 creates, based at least in part on the table declaration, a database table in the database 120 (304). For example, based on the table declaration, the computing system 110 can create the table 200 in the database 120:

The computing system 110 receives, from the user, a designation of one or more column protection owners (306). In some implementations of the current subject matter, access to the contents of a protected column is subject to dual control. First, a designated column protection owner is able to grant a user a privilege to access to one or more protected columns. In addition, an owner of a table containing the protected columns can grant a particular access mechanism (e.g., view, procedure) a privilege to access one or more protected columns. A sample statement for designating a column protection owner that is consistent with some implementations of the current subject matter is shown below:

ALTER SCHEMA <schemaname> SET <username> as COLUMN-PROTECTION-OWNER

For example, using the sample statement above, the first user 152 can designate, for example, the second user 154 as a column protection owner. In doing so, the first user 152 is allowing the second user 154 to control who can access certain columns in a database table (e.g., the column 204 in the table 200). In some implementations of the current subject matter, an owner of a database table (e.g., the first user 152) can act as the column protection owner for that database table. In addition, a different user who is not an owner of the database table (e.g., the second user 154) can also act as the column protection owner without departing from the scope of the present disclosure.

The computing system 110 receives, from the column protection owner, one or more protection configurations designating at least one column in the database table as a protected column (308). For example, the computing system 110 may receive, from the column protection owner (e.g., the second user 154), a protection configuration to impose encryption and/or protection (e.g., user and/or access mechanism based access control) on the contents of the column 204 from the table 200.

In some implementations of the current subject matter, the protection configuration can overwrite one or more default clauses associated with a column. For instance, the column protection owner can provide one or more protection configurations to add encryption and/or protection (e.g., user and/or access mechanism based access control) to the contents of the column 204 while those contents are not encrypted and/or protected by default (e.g., as configured by the default clause in the sample table declaration above). An example protection configuration statement that is consistent with some implementations of the current subject matter is shown below:

CONFIGURE COLUMN-PROTECTION <prot_conf_name> PROTECTION-MODE
(NOT ENCRYPTED | ENCRYPTED [WITH [option=E1] [method 'AES256']
[[NO] SALT] KEY (GENERATED | FROM_KEYBROKER)])
AND [NOT] PROTECTED The computing system 110 receives, from the column protection owner, a specification of one or more users with a privilege to access the contents of the at least one protected column (310). For example, the column protection owner (e.g., the second user 154) can specify one or more users who have a privilege to access the contents of the column 204 of the table 200. An example of a statement granting column access to a user that is consistent with some implementations of the current subject matter is shown below:

GRANT COLUMN-ACCESS 'SALARY' TO USER OTTOKAR

In some implementations of the current subject matter, a column protection owner can also revoke a user's privilege to access one or more protected columns. An example of a statement for revoking access privilege that is consistent with some implementations of the current subject matter is shown below:

REVOKE COLUMN-ACCESS 'SALARY' FROM USER OTTOKAR;

The computing system 110 can provide dual control over access to the contents of the database table (312). For example, the computing system 110 can control access to the contents of the table 200 based at least in part on the table declaration, the designation of one or more column protection owners, the one or more protection configurations, and/or the specifications of access mechanisms and/or users with a privilege to access the contents of the protected columns.

In some implementations of the current subject matter, access to the contents of a protected column is subject to dual control (e.g., user and/or access mechanism based access control). Direct granting of column access privileges to one or more users can require more effort by the column protection owner than granting column access to access mechanisms (e.g., views, procedures). As such, in some implementations of the current subject matter, column access privileges may be granted directly to users under a limited set of circumstances including, for example, for critical access mechanisms. A non-critical access mechanism may be a view or a procedure that accesses only a user's own data. By contrast, a critical access mechanism may be a view or a procedure that accesses data associated with multiple users.

Accordingly, uncritical access mechanisms (e.g., views, procedures) can be granted unrestricted column access such that any user (e.g., having conventional SQL object privileges and/or analytic privileges) can use an uncritical access mechanism to access the contents of one or more protected columns. By contrast, critical access mechanisms (e.g., views, procedures) can only be used by users with the required column access privilege such that only certain users can use these critical access mechanisms to access the contents of one or more protected columns. Thus, in some implementations of the current subject matter, only a limited number of users may be granted the privilege to use a critical access mechanism to access the contents of a protected column.

For example, the first user 152 may attempt to access the column 204 of the table 200. The table 200 may contain data associated with a plurality of employees while the column 204 may contain salary data for the plurality of employees. In this scenario, a non-critical access mechanism for the first user 152 may be a view or a procedure that accesses only those contents from the column 204 that relate to salary data associated with the first user 152. By contrast, a critical access mechanism for the first user 152 may be a view or a procedure that accesses contents from the column 204 that relate to salary data for other employees in addition to and/or instead of the first user 152. The first user 152 may be granted a privilege to use a critical access mechanism to access the contents of the column 204 if the first user 152 is, for example, a human resources director.

Examples of statements granting column access to one or more critical access mechanisms that are consistent with some implementations of the current subject matter are shown below:

```
GRANT COLUMN-ACCESS 'SALARY' TO VIEW SHOW_MY_SALARY;
GRANT COLUMN-ACCESS 'SALARY' TO PROCEDURE SALARY_UPDATE;
GRANT COLUMN-ACCESS 'SALARY' TO USER OTTOKAR FOR VIEW UNMASKED_EVERYTHING;
```

Figure 4:
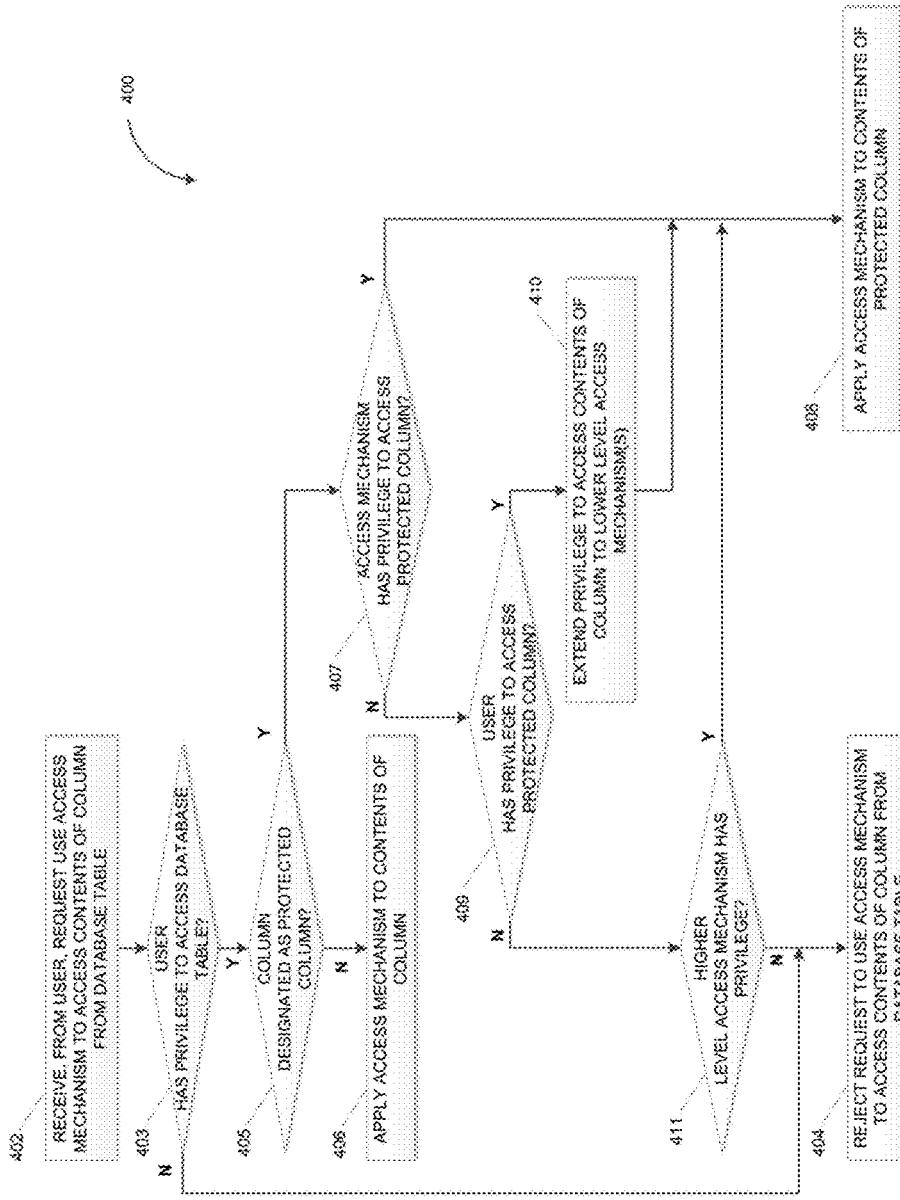
FIG. 4 depicts a flowchart illustrating a process for applying access controls to a database consistent with implementations of the current subject matter.

FIG. 4 depicts a flowchart illustrating a process 400 for applying access controls to a database consistent with implementations of the current subject matter. Referring to FIGS. 1-2 and 4, the process 400 can be performed by the computing 110 to control access to the contents of one or more columns in a database table stored at the database 120. In some implementations of the current subject matter, the process 400 can implement operation 314 of the process 300.

The computing system 110 receives, from a user, a request to use an access mechanism to access the contents of at least one column from a database table (402). For example, the computing system 110 can receive, from the second user 154, a request generate a view or to perform a procedure (e.g., update) on the contents of the column 204 from the table 200.

The computing system 110 determines whether the user has a privilege to access the database table (403). For example, the computing system 110 may determine whether the user has a privilege to access the table 200 by performing one or more SQL operations (e.g., select, update, delete) on the table 200. The user may (or may not) have the privilege to perform one or more SQL operations on both protected and unprotected columns in the table 200. If the computing system 110 determines that the user does not have the privilege to access the database table (403-N), the computing system 110 can reject the request use the access mechanism to access contents of the at least one column from the database table (404).

Alternately, if the computing system 110 determines that the user has the privilege to access the database table (403-Y), the computing system 110 determines whether at least one of the requested columns is designated as a protected column (405). For example, the computing system 110 can determine whether a column protection owner of the table 204 designated the column 204 as a protected column such that access to the contents of the column 204 is restricted to certain users and/or access mechanisms (e.g., views, procedures).

If the computing system 110 determines that none of the requested columns is designated as a protected column (405-N), the computing system 110 can apply the access mechanism to the contents of the at least one column (406). For example, if the column 204 is not designated as a protected column, the computing system 110 can generate a view and/or perform a procedure (e.g., update) on the contents of the column 204 from the table 200.

Alternately, the computing system 110 can determine that the at least one column of the database table is designated as a protected column (405-Y). As such, the computing system 110 can determine whether the access mechanism has a privilege to access the contents of the protected column (407). For example, a view can be generated and/or a procedure can be performed on the contents of the column 204 if the owner of the table (e.g., the first user 152) granted such privilege to access the contents of the column 204 (e.g., using one or more of the sample statements above). Thus, if the computing system 110 determines that the access mechanism has the privilege to access the contents of the protected column (407-Y), the computing system 110 can apply the access mechanism to the contents of the protected column (408). In some implementations of the current subject matter, the access mechanism requested by the user may include generating a view of the contents of a protected column (e.g., the column 204 from the table 200). Alternately, the access mechanism requested by the user may include applying a procedure (e.g., select, update, delete) to the contents of the protected column.

Alternately, if the computing system 110 determines that the access mechanism does not have the privilege to access the contents of the protected column (407-N), the computing system 110 can determine whether the user has a privilege to access the protected column (409). For example, the second user 154 (or a different user) may have privilege to access the contents of the column 204 if the column protection owner (e.g., the first user 152 and/or a different user) granted the second user 154 (or a different user) the privilege to access to the contents of the column 204.

If the computing system 110 determines that the user has the privilege to access the contents of the protected column (409-Y), the computing system 110 can extend, to at least one lower-level access mechanism, the privilege to access the contents of the protected column (410). The computing system 110 can further apply the access mechanism to the contents of the protected column (408). For example, the computing mechanism 110 can generate a view and/or perform a procedure on the contents of the column 204 from the table 200.

Figure 5:
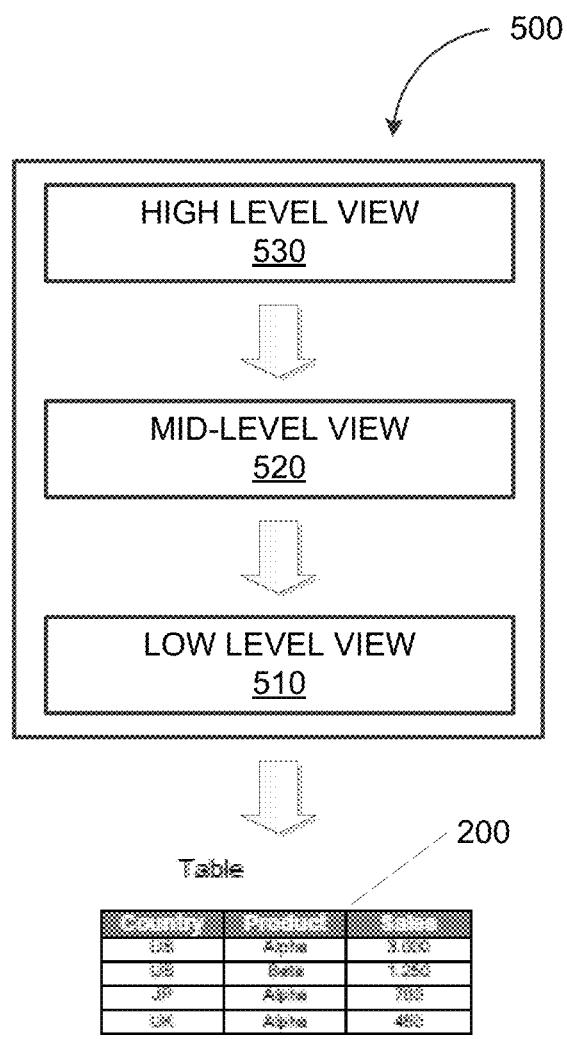
FIG. 5 depicts a view stack consistent with implementations of the current subject matter.

In some implementations of the current subject matter, an access mechanism may be a part of a hierarchy of access mechanisms. For instances, a plurality of views of a database table (e.g., the table 200) may be stacked. FIG. 5 depicts a view stack 500 consistent with implementations of the current subject matter. Referring to FIGS. 2 and 5, the view stack 500 can include a plurality of hierarchical views including, for example, a low level view 510, a mid-level view 520, and a high level view 530.

As shown in FIG. 5, the low level view 510 requires direct access to data from the table 200 (e.g., the column 204). For instance, the low level view 510 may be generated by retrieving at least a portion of the data from the table 200. Meanwhile, the mid-level view 520 requires access to data from the low level view 510 while the high level view 530 requires access to data from the mid-level view 520. For instance, the mid-level view 520 may be generated by applying one or more operations (e.g., filter, mask, aggregate) on the data in the low-level view 510. Meanwhile, the high-level view 530 may be generated by applying one or more operations (e.g., filter, mask, aggregate) to the data in the mid-level view 520.

In some implementations of the current subject matter, a user (e.g., the second user 154) may have a privilege to access the data via one or more views in the view stack 500. For instance, the second user 154 may be permitted to access contents from the column 204 via the high-level view 530. As such, the second user 154 may have indirect access to the contents of the column 204 via the mid-level view 520 and the low-level view 510. That is, the second user 154 may access only the high-level view 530, which may present a processed (e.g., filtered, masked, aggregated) form of the data from the mid-level view 520. Meanwhile, the mid-level view 520 may further present a processed (e.g., filtered, masked, aggregated) for of the data from the low-level view 510. In this regard, the second user 154 does not have any direct access to data from the mid-level view 520 or data from the low-level view 510.

If the computing system 110 determines that the user does not have the privilege to access the contents of the protected column (409-N), the computing system 110 can determine whether at least one higher-level access mechanism has a privilege to access the contents of the protected column (411). If the computing system 110 determines that there is not at least one higher level access mechanism with the privilege to access the protected column (411-N), the computing system 110 can reject the request to use the access mechanism to access the contents of the at least one column from the database table (404). In some implementations of the current subject matter, the computing system 110 can reject the request by providing an error message.

Alternately, the computing system 110 can determine that there is a higher-level access mechanism with the privilege to access the protected column (409-Y). As such, the computing system 110 can apply the access mechanism to the contents of the protected column (408). For example, the computing mechanism 110 can generate a view and/or perform a procedure on the contents of the column 204 from the table 200.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims. One or more of the processes set forth herein can include additional and/or different operations than shown without departing from the scope of the present disclosure. Moreover, one or more operations of these processes can be omitted and/or repeated without departing from the scope of the present disclosure.

What is claimed is:

1. A method for column protection, comprising:
   receiving, from a first user, a table declaration for creating a database table in a database;
   generating, based at least in part on the table declaration, the database table in the database;
   receiving, from the first user, a specification of one or more access mechanisms that have a privilege to access the database table, the one or more access mechanisms including a non-critical access mechanism for a user to access content associated with the user but not content associated with other users, and the one or more access mechanisms further including a critical access mechanism for the user to access content associated with other users;
   receiving a designation of at least one column in the database table as a protected column and of a second user who has a privilege to access the content of the protected column; and
   providing control over access to the content of the protected column based at least in part on the specification of the one or more access mechanisms and the designation of the at least one column and of the second user, wherein the providing of control includes:
      enabling, based at least on the second user being designated to have the privilege to access the content of the protected column, the second user to use the critical access mechanism to access content from the protected column that is associated with other users; and
      preventing, based at least on a third user not being designated to have the privilege to access the content of the protected column, the third user from using the critical access mechanism to access the content of the protected column that is associated with other users.

2. The method of claim 1, further comprising:
   receiving, from the first user, a designation of one or more column protection owners, wherein the designation of the protected column and of the second user who has the privilege to access the content of the protected column are valid only when received from the one or more designated column protection owners.

3. The method of claim 1, wherein the database table is generated to include columns that are not protected by default, and wherein the one or more protection configurations changes an original configuration of the database table such that the at least one column in the database table is protected.

4. A computer program product comprising a non-transitory machine-readable medium storing instructions that, when executed by at least one programmable processor, cause the at least one programmable processor to perform operations comprising:
   receiving, from a first user, a table declaration for creating a database table in a database;
   generating, based at least in part on the table declaration, the database table in the database;
   receiving, from the first user, a specification of one or more access mechanisms that have a privilege to access the database table, the one or more access mechanisms including a non-critical access mechanism for a user to access content associated with the user but not content associated with other users, and the one or more access mechanisms further including a critical access mechanism for the user to access content associated with other users;
   receiving a designation of at least one column in the database table as a protected column and of a second user who has a privilege to access the content of the protected column; and
   providing control over access to the content of the protected column based at least in part on the specification of the one or more access mechanisms and the designation of the at least one column and of the second user, wherein the providing of control includes:
      enabling, based at least on the second user being designated to have the privilege to access the content of the protected column, the second user to use the critical access mechanism to access content from the protected column that is associated with other users; and
      preventing, based at least on a third user not being designated to have the privilege to access the content of the protected column, the third user from using the critical access mechanism to access the content of the protected column that is associated with other users.

5. The computer program product of claim 4, further comprising:
   receiving, from the first user, a designation of one or more column protection owners, wherein the designation of the protected column and of the second user who has the privilege to access the content of the protected column are valid only when received from the one or more designated column protection owners.

6. A system for configuring access controls to a database, comprising:

at least one programmable processor; and at least one memory storing instructions, which when executed by the at least one programmable processor, result in operations comprising:

receiving, from a first user, a table declaration for creating a database table in a database;

generating, based at least in part on the table declaration, the database table in the database;

receiving, from the first user, a specification of one or more access mechanisms that have a privilege to access the database table, the one or more access mechanisms including a non-critical access mechanism for a user to access content associated with the user but not content associated with other users, and the one or more access mechanisms further including a critical access mechanism for the user to access content associated with other users;

receiving a designation of at least one column in the database table as a protected column and of a second user who has a privilege to access the content of the protected column; and providing control over access to the content of the protected column based at least in part on the specification of the one or more access mechanisms and the designation of the at least one column and of the second user, wherein the providing of control includes:

enabling, based at least on the second user being designated to have the privilege to access the content of the protected column, the second user to use the critical access mechanism to access content from the protected column that is associated with other users; and preventing, based at least on a third user not being designated to have the privilege to access the content of the protected column, the third user from using the critical access mechanism to access the content of the protected column that is associated with other users.

7. The system of claim 6, further comprising:

receiving, from the first user, a designation of one or more column protection owners, wherein the designation of the protected column and of the second user who has the privilege to access the content of the protected column are valid only when received from the one or more designated column protection owners.

8. The method of claim 1, further comprising:

enabling the third user from using the non-critical access mechanism to access content from the protected column that is associated with the third user but not the content from the protected column that is associated with other users.

9. The computer program product of claim 4, wherein the database table is generated to include columns that are not protected by default, and wherein the one or more protection configurations changes an original configuration of the database table such that the at least one column in the database table is protected.

10. The system of claim 6, wherein the database table is generated to include columns that are not protected by default, and wherein the one or more protection configurations changes an original configuration of the database table such that the at least one column in the database table is protected.

* * * * *